(12) United States Patent
Apsell

(10) Patent No.: US 6,651,001 B2
(45) Date of Patent: Nov. 18, 2003

(54) METHOD OF AND SYSTEM AND APPARATUS FOR INTEGRATING MAINTENANCE VEHICLE AND SERVICE PERSONNEL TRACKING INFORMATION WITH THE REMOTE MONITORING OF THE LOCATION, STATUS, UTILIZATION AND CONDITION OF WIDELY GEOGRAPHICALLY DISPERSED FLEETS OF VEHICULAR CONSTRUCTION EQUIPMENT AND THE LIKE TO BE MAINTAINED, AND PROVIDING AND DISPLAYING TOGETHER BOTH CONSTRUCTION AND MAINTENANCE VEHICLE INFORMATION

(75) Inventor: Sheldon Apsell, Newton, MA (US)

(73) Assignee: Micrologics, Inc., Westborough, MA (US)

( * ) Notice: Subject to any disclaimer, the term of this patent is extended or adjusted under 35 U.S.C. 154(b) by 54 days.

(21) Appl. No.: 10/106,131

(22) Filed: Mar. 18, 2002

(65) Prior Publication Data

US 2003/0176968 A1 Sep. 18, 2003

(51) Int. Cl.[7] ............................................. G06F 165/00

(52) U.S. Cl. ........................... 701/213; 701/29; 701/200
(58) Field of Search ............................ 701/36, 29, 200, 701/213, 207, 208; 73/178 R; 340/439

(56) References Cited

U.S. PATENT DOCUMENTS

| | | | | |
|---|---|---|---|---|
| 5,619,412 A | * | 4/1997 | Hapka | 701/36 |
| 5,815,071 A | * | 9/1998 | Doyle | 340/439 |
| 6,047,234 A | * | 4/2000 | Cherveny et al. | 701/200 |

* cited by examiner

Primary Examiner—Richard M. Camby
(74) Attorney, Agent, or Firm—Rines and Rines

(57) ABSTRACT

An integrated monitoring system for integrating and displaying the location of widely dispersed construction vehicle equipments at their respective sites together with the present location and recent track of respective maintenance vehicles for servicing the equipments, through the use of satellite positioning, wireless data communication and Internet facilities for determining such locations.

7 Claims, 1 Drawing Sheet

Figure 1:
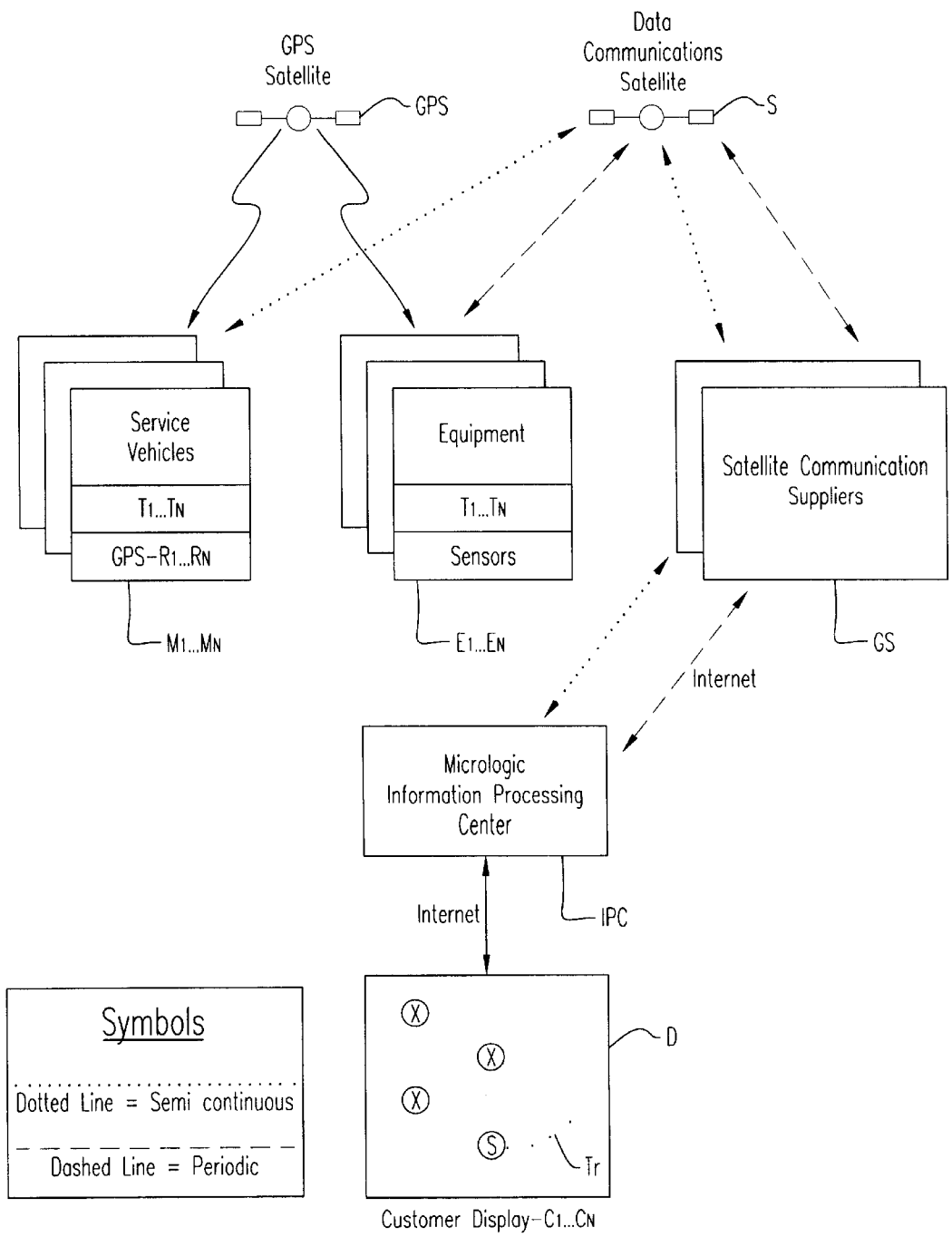

METHOD OF AND SYSTEM AND APPARATUS FOR INTEGRATING MAINTENANCE VEHICLE AND SERVICE PERSONNEL TRACKING INFORMATION WITH THE REMOTE MONITORING OF THE LOCATION, STATUS, UTILIZATION AND CONDITION OF WIDELY GEOGRAPHICALLY DISPERSED FLEETS OF VEHICULAR CONSTRUCTION EQUIPMENT AND THE LIKE TO BE MAINTAINED, AND PROVIDING AND DISPLAYING TOGETHER BOTH CONSTRUCTION AND MAINTENANCE VEHICLE INFORMATION

FIELD OF INVENTION

The present invention is broadly concerned with keeping track of the location, status, degree of utilization and condition and operability of widely geographically dispersed fleets of vehicular construction equipment and the like, using the resources of satellite positioning and communication Internet facilities to provide the fleet owner with displays of such information to enable the capability of utilizing the information, suitably processed, on periodically provided schedule, or upon specific request, to monitor and improve fleet utilization, efficiency, and cost-effectiveness; and, more particularly, to the maintenance or service of such remote equipment with maintenance vehicles servicing the construction sites, and tracking and displaying also the location and operation of the maintenance vehicles and personnel together with the positional information on the equipment vehicles.

BACKGROUND

In the earlier co-pending U.S. patent application of the common assignee of the present invention, Ser. No. 09/416,604 filed Oct. 12, 1999, for Method Of And Apparatus For Remotely Monitoring The Location Status, Utilization And Condition Of Widely Geographically Dispersed Fleets Of Vehicular Construction Equipment And The Like And Providing And Displaying Such Information, a system is disclosed that uses satellite positioning and communication Internet facilities for remotely monitoring heavy construction equipment and other expensive mobile assets. One of the numerous uses of the system is, as earlier indicated, to enable the owners and operators of construction vehicles more efficiently to maintain their fleet. By capturing, for example, the actual engine run-hours and knowing where the equipment is located, the maintenance managers can automatically know when and where to service their construction vehicles.

Because the construction equipment is large and not easily moved, much of the scheduled maintenance is performed at the construction sites requiring that the maintenance vehicle and service personnel must be dispatched to the sites. The concepts of said copending application address the status of the construction equipment; but they do not address the status of the maintenance vehicles and personnel. The current invention now provides such an added function through the integration of a real-time tracking capability installed on the maintenance vehicles, As disclosed in said copending application, a construction equipment vehicular equipment transponder-satellite data communication link system is provided wherein information sent by transponders of vehicular equipments of a widely geographically dispersed fleet of equipments is relayed by the data satellite to a ground station and thence via the Internet to an information-processing center. The system uses on-board sensors for inputting to the transponders at each equipment of the fleet, locally sensed parameter data such as temperature, run hours, fuel level, battery voltage and/or other equipment engine parameters. Upon each equipment transponder receiving GPS location signals from the GPS satellite, the transponder is caused to transmit to the data satellite information as to its location and as to said locally sensed data, and such information is relayed from the data satellite to a ground station and thence, via the Internet, to said center. Signal processing is provided at the center for processing the relayed information to effect one or more of geographical and tabular location display of the widely dispersed equipments and/or for optionally selected equipments, and optionally selected parameters, limits and conditions of such equipments, to provide processed information suitable to exercise management analysis of equipment utilization and operational efficiency. Such processed information is then communicated to the fleet manager for enabling improving the efficiency of such equipment utilization and operation.

In accordance with the present invention, the maintenance vehicles and personnel attending or assigned to attend the needs at the remote construction vehicles sites are also tracked. Each maintenance vehicle is provided with an on-board GPS receiver and a satellite communications terminal, and periodically reports its position to the same data processing center facility that stores and processes the information on the construction equipment vehicles. This reporting from the maintenance vehicles, in accordance with this invention, occurs very frequently when the maintenance vehicle is in motion, but much less frequently or occasionally when the vehicle is stopped. The software then simultaneously displays to the fleet maintenance manager the status of both the construction equipment to be serviced and the status of the maintenance vehicles.

While the providing of GPS location systems for service vehicles by itself is not new, it is the integration of the two functions in the manner of this invention (i.e. of information on the vehicles requiring service together with the information on the vehicles for performing such service) that is now provided By integrating these two functions with the GeoFencing feature described in said copending application, furthermore, one can automatically keep track of how much time the service technicians spend traveling and how much time they spend on the job site. This feature is very useful to service organizations that provide third party maintenance and need to know how many hours to bill for the services performed.

OBJECTS OF INVENTION

The primary object of the present invention, accordingly, is to provide a new and improved method of and system and apparatus for integrating remote maintenance vehicle and service personnel tracking information with the information resulting from the remote monitoring of location, status, utilization and condition of widely geographically dispersed fleets of vehicular construction equipment and the like that require such maintenance and service.

A further object is to provide a novel user-friendly integrated display of information on both the equipment vehicles requiring service and the maintenance vehicles dispatched to perform such services.

Other and further objects are also later pointed out and are hereinafter more particularly delineated in the appended claims.

SUMMARY

In summary, however, from one of its broader aspects, the invention embraces in a system for remotely monitoring the location, status, utilization and condition of widely geographically dispersed fleets of vehicular construction equipment, by using the resources of satellite positioning, wireless data communication and Internet facilities, and processing and displaying such information for use by fleet managers and the like, a method of integrating maintenance vehicle and service personnel information into such displaying of the location of the vehicular construction equipment, that comprises, displaying the construction equipment location information; integrating into such displaying, the simultaneous displaying of satellite positioning-derived location information of the maintenance vehicles servicing said equipment at the respective equipment sites through real-time tracking using said resources and processing; and further displaying the recent tracks as well as the present locations of such maintenance vehicles.

Preferred and best mode designs are later detailed.

DRAWINGS

The invention will now be described in connection with the accompanying drawing, which is a schematic representation of the overall system of the invention in preferred form.

DESCRIPTION OF PREFERRED EMBODIMENT OF INVENTION

In the drawing, the overall system and method of the invention is diagrammatically illustrated, implemented to contain the vehicular equipment transponder-satellite communication link system of said copending application wherein information sent by the transponders $T_1 \ldots T_N$ of respective vehicular equipments $E_1 \ldots E_N$ of a widely geographically dispersed fleet of equipments is relayed by a communications data satellite S to a ground station GS and thence via the Internet to an information-processing center IPC, sometimes called an information management facility. The transponders provided on each piece of fleet equipment collect positional data from GPS satellites, so-labeled; and equipment-operating data is collected by sensors at the equipment as to the condition of the equipment, and such is sent to the communications satellite(s) and thence relayed to the ground-based radio or wireless system GS. From the station GS, the information is sent, as over the Internet, to the IPC which then processes the information as to several or all of the locations, utilizations, status and conditions of the vehicular equipments $E_1 \ldots E_N$ and in sufficient detail to enable efficient management of the equipments by the ultimate fleet manager or other customers $C_1 \ldots C_N$. The before-mentioned sensors (so-labeled), input to the transponders at each equipment of the fleet, the locally sensed parameter data such as temperature, run hours, fuel level, battery voltage, fluid processing and other equipment engine and transponder parameters as described in said copending application. Upon each equipment transponder $T_1 \ldots T_N$ receiving positional GPS signals from the navigation GPS satellites (takes about 3 minutes for sending), the transponder transmits to the data communications satellite S information as to its location and as to this locally sensed data. The satellite S, in turn, relays this information, from the satellite to the ground station GS and thence, as before stated, via the Internet to the center IPC, where signal-processing means at the center adapts or conditions the relayed information for one or more of geographical and tabular location displays D of the widely dispersed equipments, as described more fully in said copending application and as shown at the locations "X" on the display communicated, again over the Internet or otherwise, to the fleet manager customers $C_1 \ldots C_N$ for enabling improving said efficiency of utilization and operation.

Periodic data transfers, typically once a day, for example, or up to several times a day, if desired, or as little as once a week or less, are represented in the drawing by the dashed lines symboled "Periodic".

Examples of suitable software-implemented display are detailed in said copending application wherein equipment type-make-model-user and location may also be tabularly presented, as may be the geographical distribution, and further, the run hours and hours to maintenance—all providing interactive maps and reports in, for example, a Windows environment, based on the continuing flow of processed information. The selected equipments and/or selected parameters and conditions thereof, etc. may also be presented in different distinctive colors, as well.

As before stated, the important further contribution of the present invention, is to integrate with the monitored equipment location displays of said copending application, shown at "X" in the drawing herein, a simultaneous presentation on the display D of the real-time location "S" of the maintenance vehicles themselves (and their service personnel) all relative to and together with the positional site locations "X" of the construction vehicles.

As earlier mentioned, this result is attained by equipping each of the maintenance or service vehicles $M_1 \ldots M_N$ with an onboard GPS receiver GPS-$R_1 \ldots$ GPS-$R_N$ and a data communications satellite terminal $T_1 \ldots T_N$, enabling semi-continuous reporting via the dotted-line paths ("semi continuous") of the maintenance vehicle/personnel to the common data processing center facility IPC that processes and stores the information on the construction equipment vehicles $E_1 \ldots E_N$. In accordance with the preferred embodiment of the present invention, this maintenance or service vehicles/personnel reporting occurs relatively frequently when the maintenance vehicle is in motion, as earlier mentioned, typically once every 4–6 minutes, for example, but much less frequently if the vehicle is stopped—say, for example, every 1–2 hours or so. The software that accordingly enables the maintenance vehicle displays "S" at D to the customer fleet maintenance managers, together with the construction vehicle equipment sites "X", and, preferable together with the recent track Tr of the past recent movement of the maintenance vehicles, shown dotted.

The employment of the present invention, thus, is targeted at organizations with large service departments that need to keep track not only of their vehicular construction equipment in the field, but also of their service personnel and equipment, providing fully integrated tracking of the mobile service vehicles and thereby allowing management personnel to synchronize the day's activities from a desktop or laptop computer, while satisfying the need for emergency repairs to "down" equipment machines in the field.

Using state-of-the-art global positioning and geo-synchronous satellite communications techniques, as before detailed, the location of each and every service vehicle in the fleet is plotted and updated on a minute-to-minute basis, linking and displaying both construction equipment vehicles and service vehicles on the same map display D so as to provide management with the tools to make quick, accurate, cost-effective, service-oriented decisions in short time and with a seamless overlay of both the fleet of equipment working in the field and the service personnel working in the field available to maintain the same. When the service manager receives a "machine down" call, the manager can immediately locate the closest service vehicle and technician to that site for instant dispatch, bringing a locator map up on the screen that shows where equipment and personnel are located in virtually real time, and all done automatically 24 hours a day, seven days a week, and 365 days a year, via wireless communications. The user can zoom in as tight as the street locations or zoom back to reveal the entire city, county, state, country or even the entire world.

Further modifications will also occur to those skilled in this art, and such are considered to fall within the spirit and scope of the invention as defined in the appended claims.

What is claimed is:

1. In a system for remotely monitoring the location, status, utilization and condition of widely geographically dispersed fleets of vehicular construction equipment, by using the resources of satellite positioning, wireless data communication and Internet facilities, and processing and displaying such information for use by fleet managers, a method of integrating maintenance vehicle and service personnel information into such displaying of the location of the vehicular construction equipment, that comprises, displaying the construction equipment location information; integrating into such displaying, the simultaneous displaying of satellite position-derived location information of the maintenance vehicles servicing said equipment at the respective equipment sites through real-time tracking using said resources and processing; and further displaying the recent tracks as well as the present locations of such maintenance vehicles.

2. The method of claim 1 wherein the reporting of the location of the maintenance vehicles for display is made relatively frequently when the maintenance vehicle is in motion, and relatively occasionally when such vehicle is stopped.

3. The method of claim 2 wherein the frequent reporting is once every few minutes, and the occasional reporting, every one or two hours.

4. In a vehicular equipment transponder-satellite communications link system wherein information sent by transponders of vehicular equipments of a widely geographically dispersed fleet of equipments is relayed by satellite to a ground station and thence via the Internet to an information-processing center, a method of providing processed information as to several or all of the locations, utilizations, status and conditions of the vehicular equipments and in sufficient detail to enable efficient management of the equipment, that comprises, inputting to a transponder at each equipment of the fleet, locally sensed parameter data of one or more of temperature, run hours, fuel level, battery voltage and/or other equipment engine parameters; upon receiving GPS location signals, causing the transponder to transmit to the satellite, information as to its location and as to said locally sensed data; and relaying said information from the satellite to a ground station and thence, to said information-processing center; signal-processing the related information at the center to effect location display of the widely dispersed equipments and/or of optionally selected equipments, so as to exercise management analysis of equipment utilization and operational efficiency and maintenance or service requirements; providing mobile maintenance vehicles/ service personnel for servicing the requirements of the respective vehicular equipments at the respective sites and each provided with GPS location signal-receiving and satellite data communication information capability; processing the maintenance vehicle information at said information-processing center and communicating the same for displaying the present location and recent track information of the maintenance vehicle service personnel together with the equipment locations, thereby to enable the dispatch and tracking of appropriate maintenance vehicles and service personnel for the required vehicular equipment sites.

5. In a system for remotely monitoring the location, status, utilization and condition of widely geographically dispersed fleets of vehicular construction equipment using the resources of satellite positioning, wireless data communication and Internet facilities, and processing and displaying such information for use by fleet managers, a system for integrating into such displaying, the simultaneous display of the location of maintenance vehicles and their service personnel, that comprises, a GPS receiver on board each maintenance vehicle; apparatus for using said resources to communicate the GPS information on the present location and recent past track of each maintenance vehicle and to process and display the same simultaneously with the display of the construction equipment locations.

6. The system of claim 5 wherein common processing and display means is provided for the information communicated on the monitored construction equipment locations and the information on the locations of the maintenance vehicles for servicing the same.

7. The system of claim 6 wherein means is provided for periodically displaying the maintenance vehicle location information more frequently when the maintenance vehicle is in motion than when it is stopped.

* * * * *